US009028200B2

(12) United States Patent
Suciu et al.

(10) Patent No.: US 9,028,200 B2
(45) Date of Patent: May 12, 2015

(54) COUNTER ROTATING LOW PRESSURE TURBINE WITH SPLITTER GEAR SYSTEM

(75) Inventors: Gabriel L. Suciu, Glastonbury, CT (US); Brian D. Merry, Andover, CT (US); Michael E. McCune, Colchester, CT (US); Shankar S. Magge, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 534 days.

(21) Appl. No.: 13/408,229

(22) Filed: Feb. 29, 2012

(65) Prior Publication Data

US 2013/0223983 A1 Aug. 29, 2013

(51) Int. Cl.
F02C 3/067 (2006.01)
F02K 3/072 (2006.01)
F02C 3/107 (2006.01)
F02C 7/36 (2006.01)

(52) U.S. Cl.
CPC ............. *F02C 3/107* (2013.01); *F02K 3/072* (2013.01); *F02C 3/067* (2013.01); *F02C 7/36* (2013.01); *Y02T 50/671* (2013.01)

(58) Field of Classification Search
USPC ............ 415/60, 66, 69, 122.1; 416/120, 122, 416/124, 126, 128, 170 R, 172
See application file for complete search history.

(56) References Cited

U.S. PATENT DOCUMENTS

| | | | |
|---|---|---|---|
| 4,969,325 A | 11/1990 | Adamson et al. | |
| 6,763,652 B2 | 7/2004 | Baughman et al. | |
| 7,334,392 B2 | 2/2008 | Moniz et al. | |
| 7,513,103 B2* | 4/2009 | Orlando et al. | 415/9 |
| 7,726,113 B2* | 6/2010 | Orlando et al. | 415/61 |
| 7,752,836 B2* | 7/2010 | Orlando et al. | 60/268 |
| 7,841,165 B2 | 11/2010 | Orlando et al. | |
| 7,950,220 B2 | 5/2011 | Merry et al. | |
| 7,966,806 B2 | 6/2011 | Henry et al. | |
| 8,015,798 B2 | 9/2011 | Norris et al. | |
| 2005/0241292 A1 | 11/2005 | Taylor et al. | |
| 2007/0084188 A1 | 4/2007 | Orlando et al. | |
| 2008/0098718 A1 | 5/2008 | Henry et al. | |
| 2008/0120839 A1* | 5/2008 | Schilling | 29/888.02 |
| 2008/0148707 A1 | 6/2008 | Schilling | |
| 2009/0191045 A1 | 7/2009 | Suciu et al. | |
| 2010/0154384 A1 | 6/2010 | Schilling | |

(Continued)

FOREIGN PATENT DOCUMENTS

EP 2071153 A2 6/2009

OTHER PUBLICATIONS

International Search Report and Written Opinion for International Application No. PCT/US2013/027553 completed on Nov. 15, 2013.

(Continued)

*Primary Examiner* — Igor Kershteyn
(74) *Attorney, Agent, or Firm* — Carlson, Gaskey & Olds, P.C.

(57) ABSTRACT

A gas turbine engine includes a shaft defining an axis of rotation. An outer turbine rotor directly drives the shaft and includes an outer set of blades. An inner turbine rotor has an inner set of blades interspersed with the outer set of blades. The inner turbine rotor is configured to rotate in an opposite direction about the axis of rotation from the outer turbine rotor. A splitter gear system couples the inner turbine rotor to the shaft and is configured to rotate the inner set of blades at a faster speed than the outer set of blades.

21 Claims, 5 Drawing Sheets

(56) References Cited

U.S. PATENT DOCUMENTS

2010/0218478 A1    9/2010    Merry et al.
2011/0243735 A1    10/2011    Balk et al.
2012/0288358 A1    11/2012    Balk

OTHER PUBLICATIONS

International Preliminary Report on Patentability for PCT/US2013/027553. Date of Issuance Sep. 2, 2014. for.
Singapore Search Report for Singapore Application No. 11201405142S received Mar. 3, 2015.

* cited by examiner

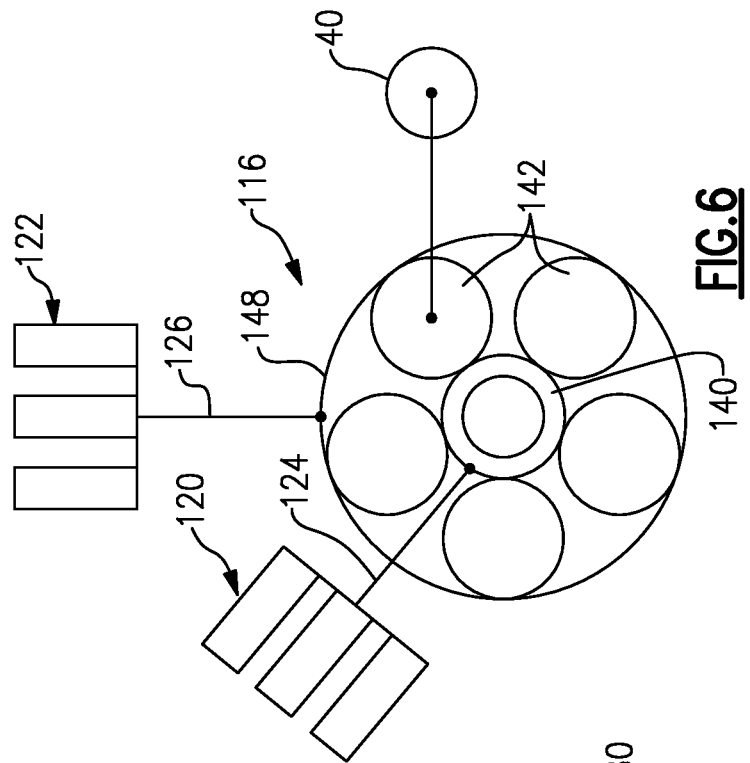
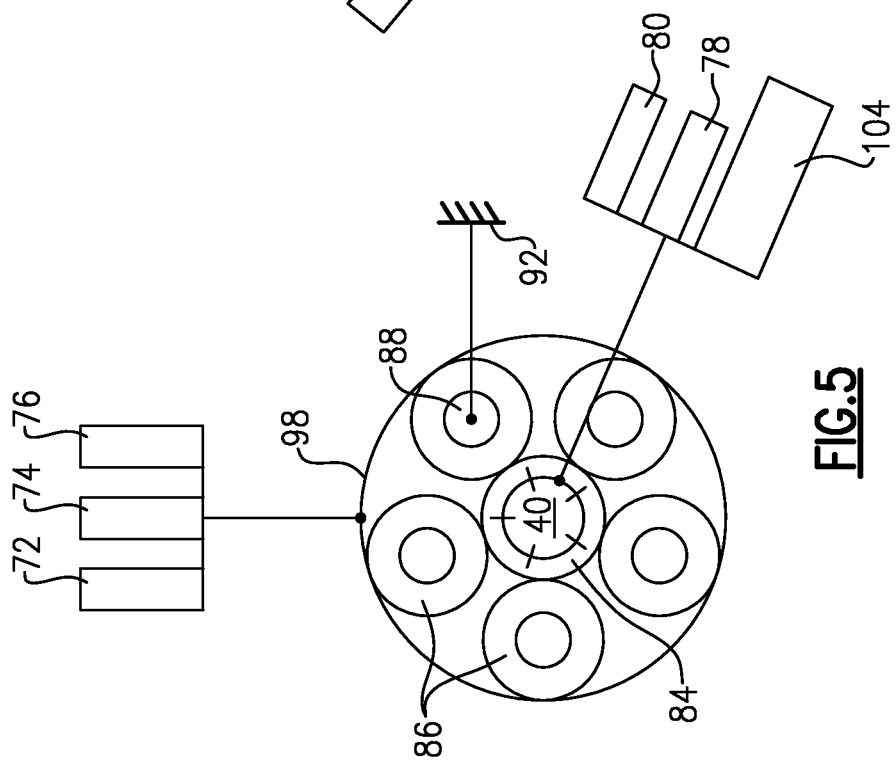

COUNTER ROTATING LOW PRESSURE TURBINE WITH SPLITTER GEAR SYSTEM

BACKGROUND

A typical jet engine has multiple shafts or spools that transmit torque between turbine and compressor sections of the engine. In one example, a low speed spool generally includes a low shaft that interconnects a fan, a low pressure compressor, and a low pressure turbine. In order to achieve a desirable high pressure core ratio, a long low shaft is required. In contrast, to increase an engine's power density, there is a countering goal of shortening the overall engine length. Thus, historically these two concepts have been at odds.

SUMMARY

In one exemplary embodiment, a gas turbine engine includes a shaft defining an axis of rotation. An outer turbine rotor includes an outer set of blades. An inner turbine rotor has an inner set of blades interspersed with the outer set of blades. The inner turbine rotor is configured to rotate in an opposite direction about the axis of rotation from the outer turbine rotor. A splitter gear system couples the inner and outer turbine rotors to the shaft and is configured to rotate the inner set of blades at a faster speed than the outer set of blades.

In a further embodiment of the above, the gear system is mounted to a mid-turbine frame.

In a further embodiment of any of the above, the splitter gear system includes a sun gear coupled to the inner rotor, a plurality of splitter gears in meshing engagement with the sun gear, and a ring gear in meshing engagement with the splitter gears.

In a further embodiment of any of the above, the sun gear is fixed for rotation with an aft end of the inner turbine rotor.

In a further embodiment of any of the above, the splitter gears are supported by a carrier that is fixed to the shaft.

In a further embodiment of any of the above, a fore end of the outer turbine rotor is coupled to the ring gear, and the fore end is supported on the mid-turbine frame by a first bearing. An aft end of the outer turbine rotor is supported on the shaft be a second bearing.

In a further embodiment of any of the above, a first bearing supports a fore end of the inner turbine rotor for rotation relative to the shaft and a second bearing supports an aft end of the inner turbine rotor for rotation relative to the shaft.

In a further embodiment of any of the above, a third bearing supports the shaft for rotation relative to the mid-turbine frame.

In a further embodiment of any of the above, the first, second, and third bearings are axially spaced apart from each other along the axis of rotation with the third bearing being located forward of the first bearing.

In a further embodiment of any of the above, a low pressure turbine static case has an aft end unsupported and a fore end connected to the mid-turbine frame.

In a further embodiment of any of the above, a fan is connected to the shaft, and the splitter gear system provides a gear reduction ratio of greater than or equal to 3:1.

In another exemplary embodiment, a gas turbine engine comprises a core flow path and a shaft couples a compressor section and a turbine section arranged within the core flow path. The turbine section includes a counter rotating low pressure turbine comprising an outer rotor having an outer set of blades and an inner rotor having an inner set of blades interspersed with the outer set of blades. The inner rotor is configured to rotate in an opposite direction about the axis of rotation from the outer rotor. A splitter gear system couples the inner and outer rotors to the shaft and is configured to rotate the inner set of blades at a faster speed than the outer set of blades.

In a further embodiment of any of the above, the gas turbine engine includes a high pressure compressor that has a pressure ratio of approximately 23:1.

In a further embodiment of any of the above, a fan is connected to the shaft, and the splitter gear system provides a gear reduction ratio of greater than or equal to 3:1.

In a further embodiment of any of the above, the splitter gear system includes a sun gear coupled to the inner rotor, a plurality of splitter gears in meshing engagement with the sun gear, and a ring gear in meshing engagement with the splitter gears.

In a further embodiment of any of the above, the sun gear is fixed for rotation with a fore end of the inner rotor, the splitter gears are supported by a carrier that is fixed to the shaft, and a fore end of the outer rotor is coupled to the ring gear.

In a further embodiment of any of the above, a first bearing supports a fore end of the inner rotor for rotation relative to the shaft, a second bearing supports an aft end of the inner rotor for rotation relative to the shaft, and a third bearing supports the shaft for rotation relative to the mid-turbine frame. The splitter gear system is supported by the mid-turbine frame.

In a further embodiment of any of the above, the first, second, and third bearings are axially spaced apart from each other along the axis of rotation with the third bearing being located forward of the first bearing. The first and third bearings are roller bearings and the second bearing is a ball bearing. A fourth bearing supports a fore end of the outer rotor relative to the mid-turbine frame, and a fifth bearing supports an aft end of the outer rotor relative to the shaft.

BRIEF DESCRIPTION OF THE DRAWINGS

The disclosure can be further understood by reference to the following detailed description when considered in connection with the accompanying drawings wherein:

FIG. 5 shows a schematic view of the lower pressure compressor shown in FIG. 2.

FIG. 6 a schematic view of the lower pressure turbine shown in FIG. 2.

DETAILED DESCRIPTION

Figure 1:
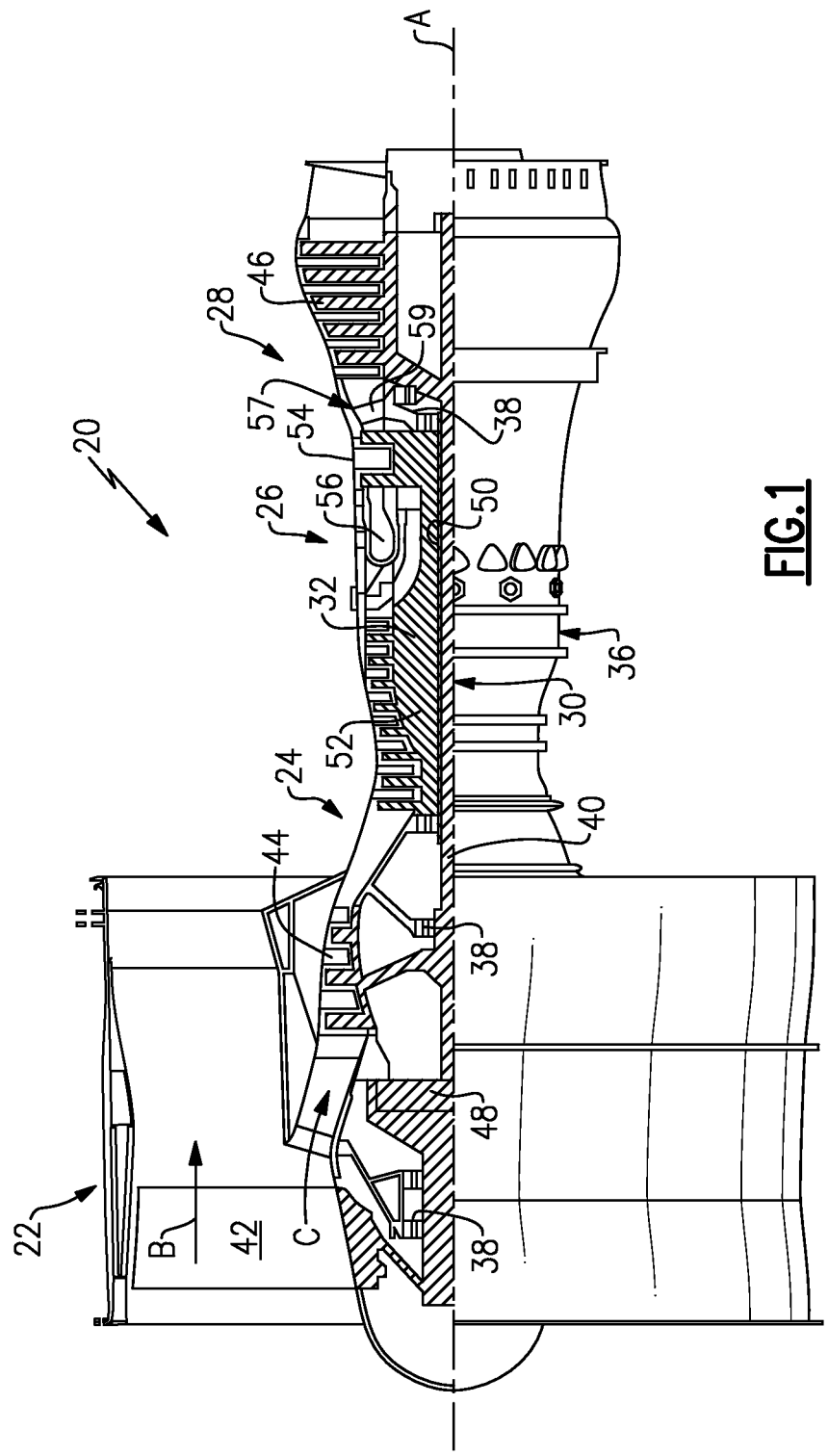
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The high speed spool 32 includes an outer shaft 50 that interconnects a high pressure (or second) compressor section 52 and high pressure (or second) turbine section 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned per hour divided by lbf of thrust the engine produces at that minimum point. "Fan pressure ratio" is the pressure ratio across the fan blade alone, without a Fan Exit Guide Vane ("FEGV") system. The fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Figure 2:
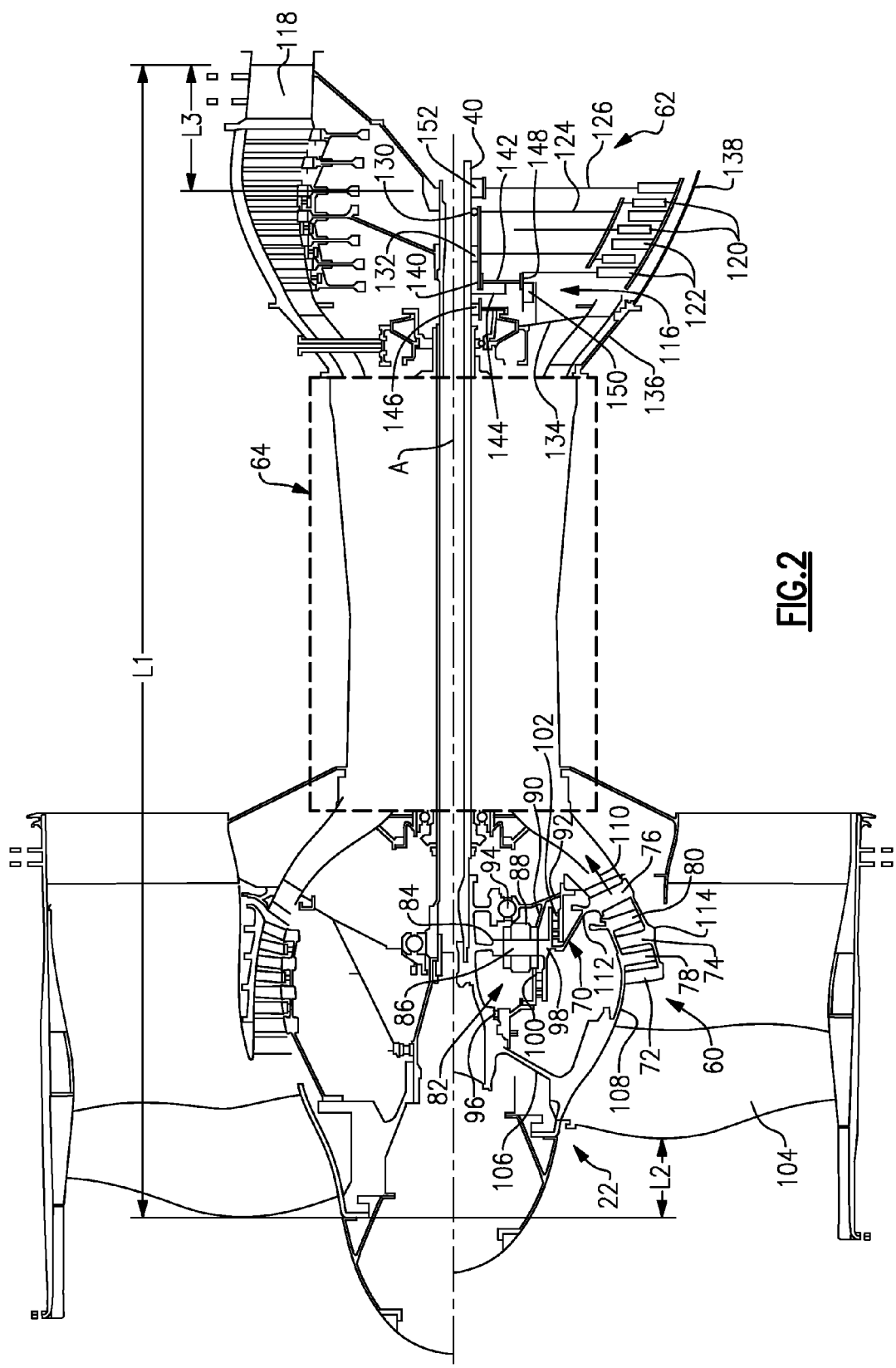
FIG. 2 is a cross-sectional view of an engine upper half showing an embodiment of a non-counter-rotating configuration and an engine lower half showing an example of a counter-rotating low pressure compressor architecture and counter-rotating low pressure turbine architecture of a gas turbine engine.
Figure 3:
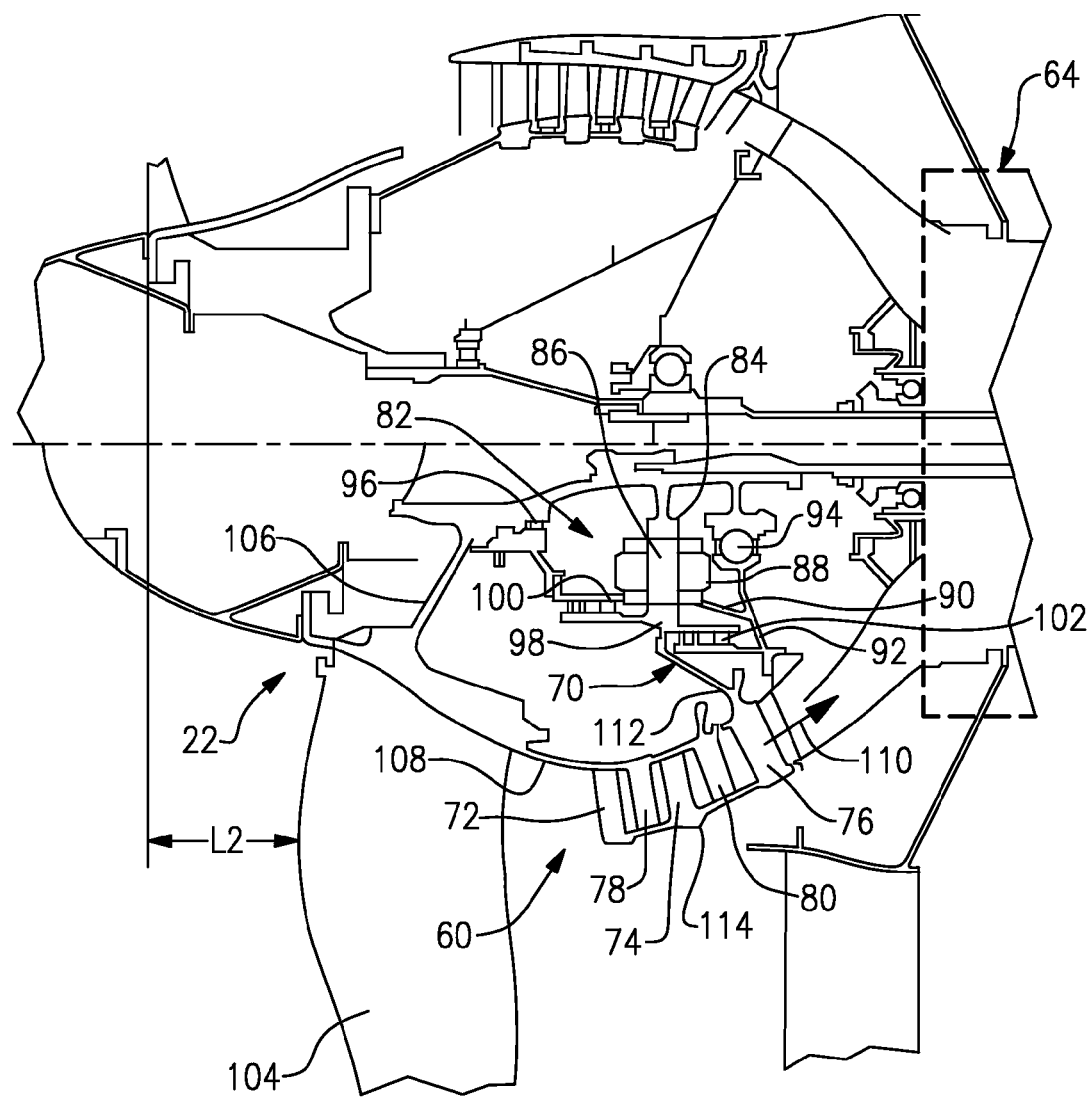
FIG. 3 shows an enlarged view of the low pressure compressor shown in FIG. 2.

Referring to FIGS. 2 and 3, a geared turbofan architecture with a counter-rotating low pressure compressor (LPC) 60 and counter-rotating low pressure turbine (LPT) 62 is provided, which significantly reduces a length of the low speed or inner shaft 40 as compared to a non-counter-rotating configuration, an example of which is shown in FIG. 1 and in the upper half of FIG. 2. This non-rotating configuration in the upper half of FIG. 2 is included for the purposes of a length comparison to the counter-rotating LPC and counter-rotating LPT configurations shown in the lower half of FIG. 2. The engine has a high pressure core, schematically indicated at 64. It is to be understood that the high pressure core 64 includes the combustor 56 and the high spool 32 (i.e., the high pressure compressor 52, the high pressure turbine 54, and the high shaft 50) shown in FIG. 1. The high pressure compressor 52 has a high pressure core ratio of 23:1, for example. To retain this ratio, as well as providing a desired low shaft diameter and speed, a combination of the counter-rotating LPC 60 and LPT 62 is utilized as shown in the lower half of FIG. 2.

One example of the LPC 60 is found in U.S. Pat. No. 7,950,220, which is assigned to the same assignee as the subject invention, and which is hereby incorporated by reference. In this example, which is shown in FIG. 2, the LPC 60 includes a counter-rotating compressor hub 70 with blade stages 72, 74, and 76 interspersed with blade stages 78 and 80 of the low speed spool 30. The counter-rotating compressor hub 70 may be driven by a transmission 82. The transmission 82 is also schematically illustrated in FIG. 5. In one example, the transmission 82 is an epicyclic transmission having a sun gear 84 mounted to the low shaft 40. A circumferential array of externally-toothed star gears 86 are in meshing engagement with the sun gear 84. The star gears 86 are carried on journals 88 carried by a carrier 90. The carrier 90 is fixedly mounted relative to an engine static structure 92. The static structure 92 is coupled to the low shaft 40 via multiple bearing systems 94 and 96 to permit rotation of the low shaft 40.

The transmission 82 further includes an internally-toothed ring gear 98 encircling and in meshing engagement with the star gears 86. The ring gear 98 is supported relative to the static structure 92 by one or more bearing systems 100 and 102. The transmission 82 causes a counter-rotation of ring gear 98. As the compressor hub 70 is engaged with the ring gear 98, the transmission 82 causes a counter-rotation of the compressor hub 70 (and blades 72, 74, 76) relative to the low speed spool 30. Fan blades 104 of the fan section 22 are mounted via a hub 106 to the low shaft 40. In addition, and low pressure compressor blades 78, 80 are also mounted to the hub 106 via a blade platform ring 108. As a result of the foregoing, the fan blades 104 and the low pressure compressor blades 78, 80 co-rotate with the low shaft 40.

An outboard surface of the platform ring 108 locally forms an inboard boundary of a core flowpath 110. The blades of stages 78 and 80 extend from inboard ends fixed to the platform ring 108 to free outboard tips. In the example shown, the blades of the downstreammost stage 76 of the hub 70 are mounted to an outboard end of a support 112. The outboard ends of the blades of the stage 76 are secured relative to a shroud ring 114. An inboard surface of the shroud ring 114 forms a local outboard boundary of the core flowpath 110. The outboard ends of the blades of the stages 72 and 74 are mounted to the shroud ring 114. The support 112 is affixed to the ring gear 98 to drive rotation of the blades of stage 76 and, through the shroud ring 114, the blades of stages 72 and 74.

As shown in the upper half of FIG. 2, in one typical non-counter-rotating configuration, the engine 20 without a counter-rotating compressor or turbine has an overall length L1 defined from a foremost surface of the fan blade 104 to an aftmost end of a turbine exhaust case 118. The LPC configuration 60 provides a length reduction L2 by utilizing a counter-rotating compressor architecture. The LPT configuration 62 provides another length reduction L3 by utilizing a counter-rotating turbine architecture. One example of a LPT is found in United States Publication No. 2009/0191045 A1, which is assigned to the same assignee as the subject invention, and which is hereby incorporated by reference.

Figure 4:
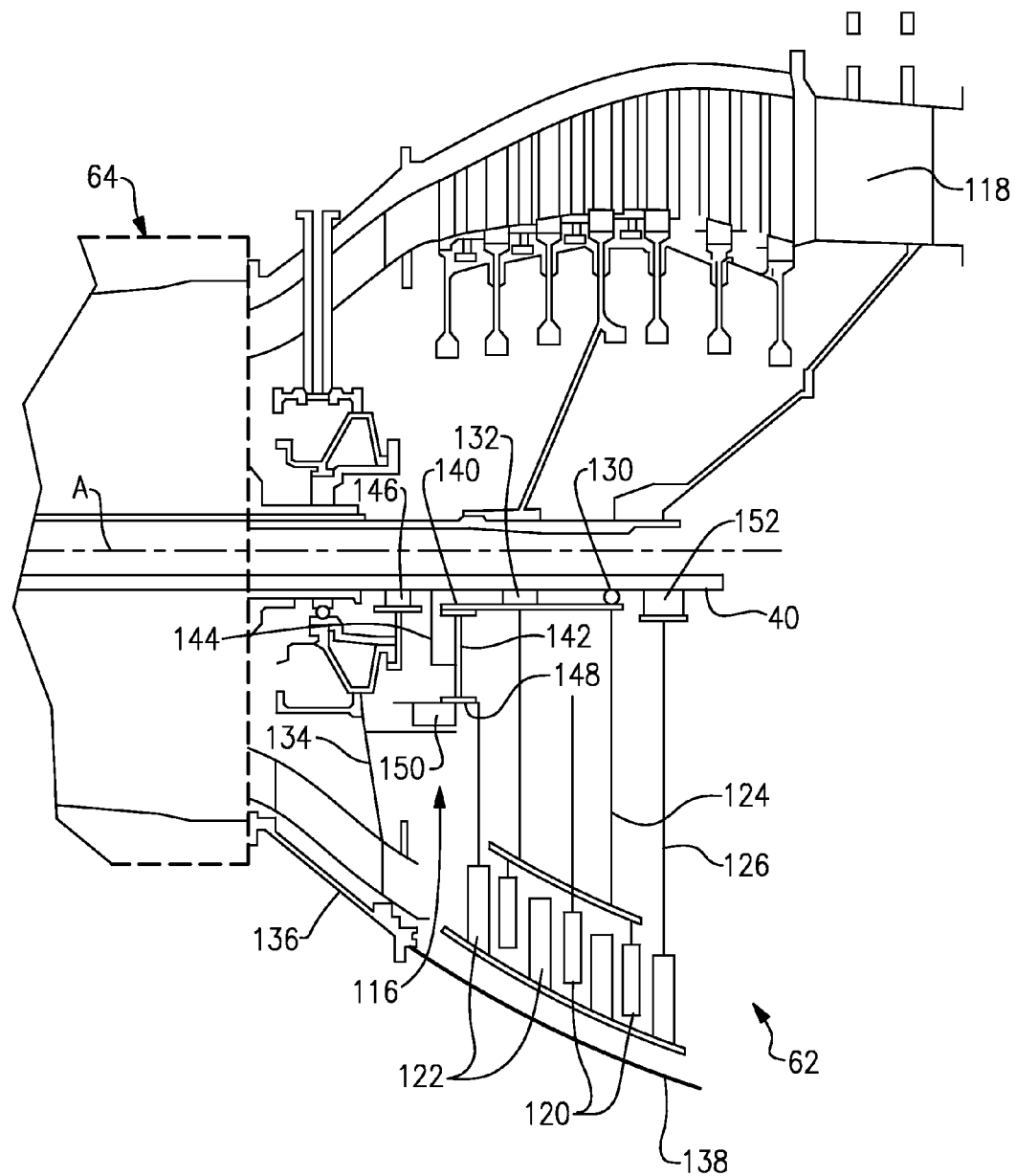
FIG. 4 shows an enlarged view of the low pressure turbine shown in FIG. 2.

FIGS. 2 and 4 show another example of a LPT 62 having a counter rotating configuration with a gear system 116 mounted to the mid turbine frame 134. The gear system 116 is also schematically illustrated in FIG. 6. As a result, no turbine exhaust case 118 is needed, which further contributes to the overall amount of length reduction L3 by shortening the LPT static case portion. In this example, the LPT 62 has an inner set of blades 120 that are coupled to the low shaft 40 via the gear system 116 and an outer set of blades 122 interspersed with the inner set of blades 120. In one example, the number of stages in the inner set of blades 120 is equal to the number of stages in the outer set of blades 122. The outer blades 122 rotate in an opposite direction about the axis of rotation from the inner set of blades 120.

The outer set of blades 122 is fixed to an outer rotor 126, which is supported at a fore end relative to the mid-turbine frame 134 by a bearing 150 and at an aft end relative to the shaft 140 by a bearing 152. The inner set of blades 120 is fixed to an inner rotor 124 that drives the gear system 116. Bearings 130, 132 rotatably support the inner rotor 124. Bearing 130 supports an aft end of the inner rotor 124 for rotation relative to the low shaft 40, and bearing 132 supports a fore end of the inner rotor 124 for rotation relative to the shaft 40. In one example, the aft bearing 130 is a ball bearing and the fore bearing 132 is a roller bearing.

A mid-turbine frame 134 comprises a static structure that extends to an outer case portion 136. The outer case portion 136 is attached to a fore end of a LPT static case 138, which surrounds the inner 120 and outer 122 sets of blades. An aft end of the LPT static case 138 is unsupported since there is no turbine exhaust case 118.

The gear system 116 includes a sun gear 140 that is fixed for rotation with a fore end of the inner rotor 124. A circumferential array of externally-toothed splitter gears 142 are in meshing engagement with the sun gear 140. The splitter gears 142 are supported by a carrier 144 that is fixed to the shaft 40 that directly drives the carrier 144 at a common speed with the shaft 40. A bearing 146 supports the low shaft 140 for rotation relative to the mid-turbine frame 134. In one example configuration, the shaft bearing 146 and the fore and aft bearings 132, 130 for the inner rotor 126 are axially spaced apart from each other along the axis A. The shaft bearing 146 is located forward of the fore bearing 132. In one example, both bearings 132, 146 are roller bearings.

A ring gear 148 is in meshing engagement with the splitter gears 142, which is in meshing engagement with both the sun gear 140 and the ring gear 148. In the example shown in FIG. 2, the fore end of the outer rotor 126 is configured to be driven by the ring gear 148. Thus, the sun gear 140, splitter gears 142 and ring gear 148 all rotate about the axis A and none of these gears are rotationally fixed relative to the axis A in a splitter gear system. This arrangement provides a differential planetary gear arrangement in which power is split between the inner and outer rotors 124, 126 through the splitter gears 142. Thus, the inner set of blades 120 rotate at a faster speed than the outer set of blades 122. In one example, the gear system has a ratio within a range of 3:1 to 8:1.

In this configuration, the gear system 116 is upstream or forward of the LPT 62. Specifically, the gear system 116 is positioned forward of the interspersed blades 120, 122 and is surrounded by the mid-turbine frame. This counter-rotating configuration allows the overall length of the LPT static case 138 to be shortened compared to a non-counter-rotating configuration, and eliminates the need for a turbine exhaust case 118. This results in a weight reduction as well as contributing to the desired length reduction L3.

In the example in the lower portion of FIG. 2, the fan 104 is directly connected to the shaft 40. The low shaft 40 receives a portion of the overall driving input from both the inner set of blades 120 and the outer set of blades 122 through the splitter gears 142 via the carrier 144. With the splitter configuration provided by the gear system 116, gear ratios of greater than 3:1, and for example between 3:1 and 8:1, may be achieved, which is greater than a 3:1 gear ratio that is achieved by one example type of fan drive gear system. These higher gear ratios provide a lower fan pressure ratio, which results in lower noise, for example.

The outer set of blades 122 is configured to rotate at a lower speed and in an opposite direction from the inner set of blades 120. Spinning the inner set of blades 120 at a higher speed takes advantage of the existing turbine disks ability to handle higher speeds. This configuration provides a geared fan architecture with a long, slow turning low shaft 40, which enables the use of a high pressure ratio core. Further, this configuration provides for significant length reduction as compared to prior configurations.

It should be understood that the LPC 60 described above is just one example configuration, and that the LPT 62 described above could be utilized with various other LPC configurations. Further, the LPT 62 could also be used in a configuration that does not include a counter rotating LPC.

As a result of the foregoing improvements, an engine has been invented that includes both a desirable high pressure core ratio, while at the same time reducing the overall engine length, thereby maximizing the engine's power density.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
    a shaft defining an axis of rotation;
    an outer turbine rotor including an outer set of blades;
    an inner turbine rotor having an inner set of blades interspersed with the outer set of blades, the inner turbine rotor configured to rotate in an opposite direction about the axis of rotation from the outer turbine rotor; and
    a splitter gear system coupling the inner and outer turbine rotors to the shaft and configured to rotate the inner set of blades at a faster speed than the outer set of blades.

2. The gas turbine engine according to claim 1, wherein the splitter gear system is supported on the mid-turbine frame.

3. The gas turbine engine according to claim 2, including a low pressure turbine static case having an aft end unsupported and a fore end connected to the mid-turbine frame.

4. The gas turbine engine according to claim 2, wherein the splitter gear system includes a sun gear coupled to the inner turbine rotor, a plurality of splitter gears in meshing engagement with the sun gear, and a ring gear in meshing engagement with the splitter gears.

5. The gas turbine engine according to claim 4, wherein the sun gear is fixed for rotation with a fore end of the inner turbine rotor.

6. The gas turbine engine according to claim 4, wherein the splitter gears are supported by a carrier that is fixed to the shaft.

7. The gas turbine engine according to claim 1, including a fan connected to the shaft, wherein the splitter gear system provides a gear reduction ratio of greater than or equal to 3:1.

8. A gas turbine engine comprising:
a shaft defining an axis of rotation;
an outer turbine rotor including an outer set of blades;
an inner turbine rotor having an inner set of blades interspersed with the outer set of blades, the inner turbine rotor configured to rotate in an opposite direction about the axis of rotation from the outer turbine rotor; and
a splitter gear system coupling the inner and outer turbine rotor to the shaft and configured to rotate the inner set of blades at a faster speed than the outer set of blades, wherein the splitter gear system includes a sun gear coupled to the inner turbine rotor, a plurality of splitter gears in meshing engagement with the sun gear, and a ring gear in meshing engagement with the splitter gears, wherein a fore end of the outer turbine rotor is coupled to the ring gear, the fore end supported on a mid-turbine frame by a first bearing, and an aft end of the outer turbine rotor supported on the shaft by a second bearing.

9. A gas turbine engine comprising:
a shaft defining an axis of rotation;
an outer turbine rotor including an outer set of blades;
an inner turbine rotor having an inner set of blades interspersed with the outer set of blades, the inner turbine rotor configured to rotate in an opposite direction about the axis of rotation from the outer turbine rotor; and
a splitter gear system coupling the inner and outer turbine rotor to the shaft and configured to rotate the inner set of blades at a faster speed than the outer set of blades, includes a first bearing supporting a fore end of the inner turbine rotor for rotation relative to the shaft and a second bearing supporting an aft end of the inner turbine rotor for rotation relative to the shaft.

10. The gas turbine engine according to claim 9, including a third bearing supporting the shaft for rotation relative to the mid-turbine frame.

11. The gas turbine engine according to claim 10, wherein the first, second, and third bearings are axially spaced apart from each other along the axis of rotation with the third bearing being located forward of the first bearing.

12. The gas turbine engine according to claim 9, wherein the splitter gear system is supported on the mid-turbine frame.

13. A gas turbine engine comprising:
a core flow path;
a shaft coupled to a compressor section and a turbine section arranged within the core flow path; and
wherein the turbine section includes a counter rotating low pressure turbine comprising
an outer rotor including an outer set of blades,
an inner rotor having an inner set of blades interspersed with the outer set of blades, the inner rotor configured to rotate in an opposite direction about the axis of rotation from the outer rotor, and
a splitter gear system coupling the inner and outer rotors to the shaft and configured to rotate the inner set of blades at a faster speed than the outer set of blades.

14. The gas turbine engine according to claim 13, comprising a high pressure compressor having has a pressure ratio of approximately 23:1.

15. The gas turbine engine according to claim 13, including a fan connected to the shaft, wherein the splitter gear system provides a gear reduction ratio of greater than or equal to 3:1.

16. The gas turbine engine according to claim 15, wherein the splitter gear system includes a sun gear coupled to the inner rotor, a plurality of splitter gears in meshing engagement with the sun gear, and a ring gear in meshing engagement with the splitter gears.

17. The gas turbine engine according to claim 13, including a first bearing supporting a fore end of the inner rotor for rotation relative to the shaft, a second bearing supporting an aft end of the inner rotor for rotation relative to the shaft, and a third bearing supporting the shaft for rotation relative to the mid-turbine frame, wherein the splitter gear system is supported by the mid-turbine frame.

18. The gas turbine engine according to claim 17, wherein the first, second, and third bearings are axially spaced apart from each other along the axis of rotation with the third bearing being located upstream from the first bearing, wherein the first and third bearings are roller bearings and the second bearing is a ball bearing, and wherein a fourth bearing supports a fore end of the outer rotor relative to the mid-turbine frame, and a fifth bearing supports an aft end of the outer rotor relative to the shaft.

19. The gas turbine engine according to claim 13, wherein the splitter gear system is supported on a mid-turbine frame extending to an outer case portion of the counter rotating low pressure turbine, the mid-turbine frame arranged upstream from the outer and inner rotors.

20. A gas turbine engine comprising:
a core flow path;
a shaft coupled to a compressor section and a turbine section arranged within the core flow path; and
wherein the turbine section includes a counter rotating low pressure turbine comprising
an outer rotor including an outer set of blades,
an inner rotor having an inner set of blades interspersed with the outer set of blades, the inner rotor configured to rotate in an opposite direction about the axis of rotation from the outer rotor, and
a splitter gear system coupling the inner and outer rotors to the shaft and configured to rotate the inner set of blades at a faster speed than the outer set of blades, wherein the splitter gear system includes a sun gear coupled to the inner rotor, a plurality of splitter gears in meshing engagement with the sun gear, and a ring gear in meshing engagement with the splitter gears, wherein the sun gear is fixed for rotation with a fore end of the inner rotor, the splitter gears are supported by a carrier that is fixed to the shaft, and a fore end of the outer rotor is coupled to the ring gear.

21. The gas turbine engine according to claim 20, including a fan connected to the shaft, wherein the splitter gear system provides a gear reduction ratio of greater than or equal to 3:1.

* * * * *